United States Patent
Prasad et al.

(10) Patent No.: US 10,635,311 B2
(45) Date of Patent: Apr. 28, 2020

(54) INFORMATION HANDLING SYSTEM WITH REDUCED RESET DURING DUAL IN-LINE MEMORY MODULE GOAL RECONFIGURATION

(71) Applicant: DELL PRODUCTS, LP, Round Rock, TX (US)

(72) Inventors: Parmeshwr Prasad, Bangalore (IN); Viswanath Ponnuru, Bangalore (IN); Ravishankar Kanakapura Nanjundaswamy, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 16 days.

(21) Appl. No.: 15/962,739

(22) Filed: Apr. 25, 2018

(65) Prior Publication Data

US 2019/0332262 A1    Oct. 31, 2019

(51) Int. Cl.
*G06F 3/06* (2006.01)

(52) U.S. Cl.
CPC .......... *G06F 3/0604* (2013.01); *G06F 3/0634* (2013.01); *G06F 3/0688* (2013.01)

(58) Field of Classification Search
CPC ........ G06F 3/06; G06F 3/0604; G06F 3/0632; G06F 3/0634; G06F 3/0679; G06F 3/0688; G06F 12/00; G06F 12/0638; G06F 3/061; G06F 3/0685; G06F 3/065; G06F 3/0644; G06F 3/0665; G06F 3/0619; G06F 12/0246
USPC ........................................................ 711/103
See application file for complete search history.

(56) References Cited

U.S. PATENT DOCUMENTS

| | | | |
|---|---|---|---|
| 6,073,172 A | 6/2000 | Frailong et al. | |
| 7,149,867 B2 * | 12/2006 | Poznanovic | G06F 9/3455 711/170 |
| 8,949,502 B2 | 2/2015 | McKnight et al. | |
| 9,710,179 B2 | 7/2017 | Jenne et al. | |
| 9,817,754 B2 | 11/2017 | Kandasamy et al. | |
| 2012/0131253 A1 * | 5/2012 | McKnight | G06F 1/30 710/308 |
| 2013/0003288 A1 * | 1/2013 | Kanapathippillai | G11C 5/04 361/679.32 |

(Continued)

OTHER PUBLICATIONS

Unpublished U.S. Appl. No. 15/907,873, filed Feb. 28, 2018.

*Primary Examiner* — Mano Padmanabhan
*Assistant Examiner* — Jean C Edouard
(74) *Attorney, Agent, or Firm* — Larson Newman, LLP

(57) ABSTRACT

An information handling system includes a management interface that may detect a configuration change request for the flash dual in-line memory modules, and may determine whether the configuration change request is a hardware configuration change or a software configuration change. In response to the configuration change request being the software configuration change the management interface may re-configure flash dual in-line memory modules based on a first profile identified by the configuration change request without resetting the information handling system, update metadata for the flash dual in-line memory modules based on the first profile without resetting the information handling system, and update a dual in-line memory module firmware interface table for the flash dual in-line memory modules based on the first profile without resetting the information handling system.

20 Claims, 4 Drawing Sheets

(56) References Cited

U.S. PATENT DOCUMENTS

| | | | |
|---|---|---|---|
| 2014/0095769 A1* | 4/2014 | Borkenhagen | G11C 5/04 711/103 |
| 2014/0237205 A1* | 8/2014 | Takefman | H03M 13/05 711/162 |
| 2015/0261446 A1* | 9/2015 | Lee | G06F 13/385 711/103 |
| 2016/0179375 A1* | 6/2016 | Kirvan | G06F 12/0246 711/153 |
| 2017/0160936 A1 | 6/2017 | Chinnakkonda Vidyapoornachary et al. | |
| 2018/0032439 A1 | 2/2018 | Jenne et al. | |
| 2018/0095691 A1* | 4/2018 | Manvar | G06F 3/0632 |

* cited by examiner

INFORMATION HANDLING SYSTEM WITH REDUCED RESET DURING DUAL IN-LINE MEMORY MODULE GOAL RECONFIGURATION

FIELD OF THE DISCLOSURE

The present disclosure generally relates to information handling systems, and more particularly relates to an information handling system with reduced reset during dual in-line memory module goal reconfiguration.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a management interface that may detect a configuration change request for the flash dual in-line memory modules, and may determine whether the configuration change request is a hardware configuration change or a software configuration change. In response to the configuration change request being the software configuration change the management interface may: re-configure flash dual in-line memory modules based on a first profile identified by the configuration change request without resetting the information handling system; update metadata for the flash dual in-line memory modules based on the first profile without resetting the information handling system; and update a dual in-line memory module firmware interface table for the flash dual in-line memory modules based on the first profile without resetting the information handling system.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
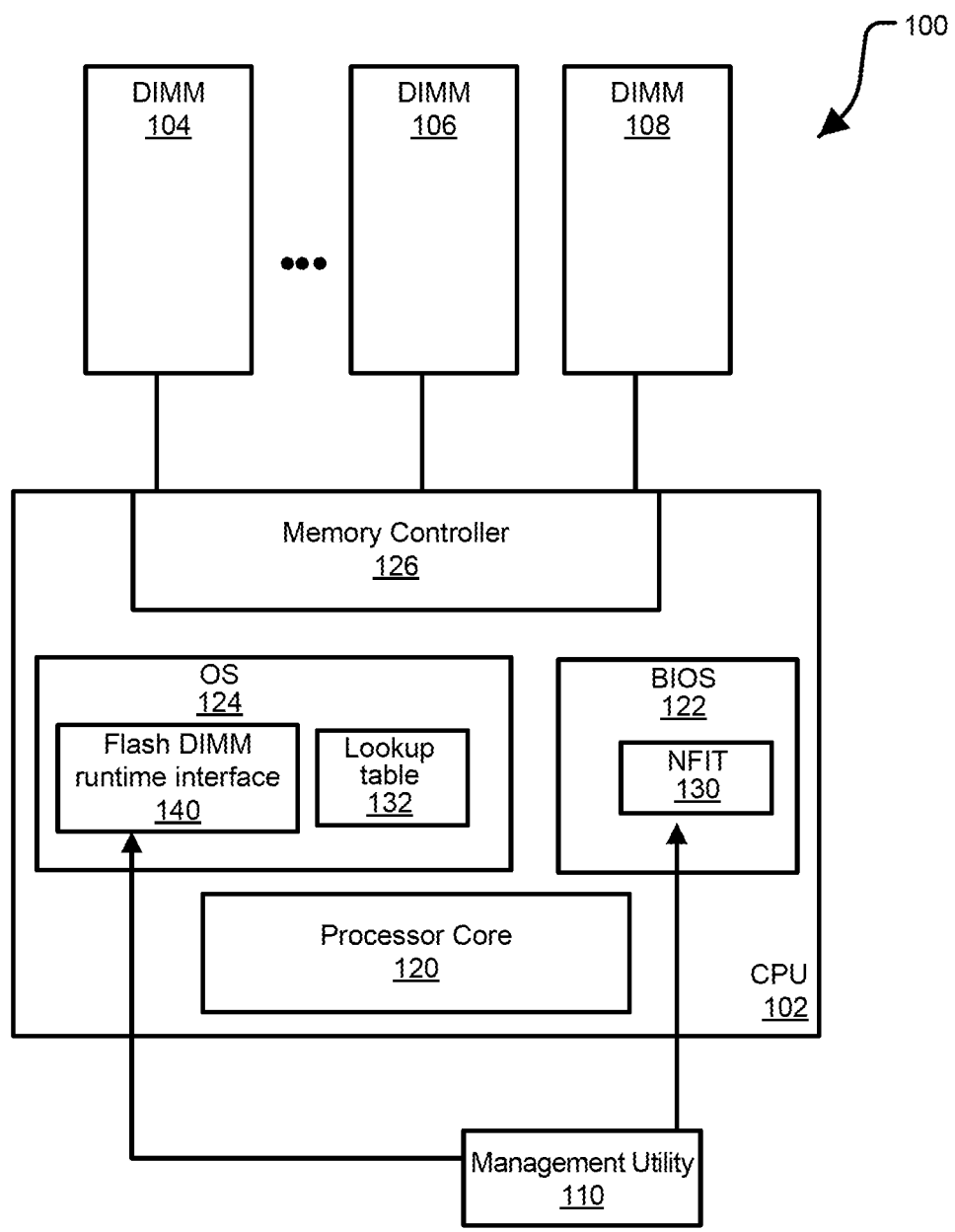
FIG. 1 is a block diagram of a portion of an information handling system according to at least one embodiment of the disclosure.

FIG. 1 shows an information handling system 100 including central processing unit (CPU) 102. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various other I/O devices, such as a keyboard, a mouse, and a video display. The information handling system may also include one or more busses operable to transmit communications between the various hardware components.

The information handling system 100 includes the CPU 102, dual in-line memory modules (DIMMs) 104, 106, and 108, and a management utility 110. In an embodiment, the information handling system 102 can be a server, a personal computer, a laptop computer, or the like. The CPU 102 includes a processor core 120, a basic input/output system (BIOS) 122, an operating system (OS) 124, and a memory controller 124. The BIOS 122 includes a non-volatile dual in-line memory module (NVDIMM) firmware interface table (NFIT) 130. In an embodiment, the NFIT 130 can store information for the DIMMs 104, 106, and 108. In an embodiment, the DIMMs 104, 106, and 108 can include only persistent memory, such as flash memory, and will be referred to herein as flash DIMMs. For example, the DIMMs 104, 106, 108 may be Apache Pass (AEP) devices. One of ordinary skill in the art will recognize that while FIG. 1 illustrates DIMMs 104, 106, and 108, this disclosure is not limited to three DIMMs but can be applied to an N-way interleave set of DIMMs, as indicated by the ellipses in between DIMMs 104 and 106.

Then during runtime of the OS 124, the OS 124 can have access to a lookup table 132, and runtime services, such as flash DIMM runtime interface 140, can be utilized by the OS 124 to configure the flash DIMMs 104, 106, and 108 based on profiles within the lookup table 132. While these operations are being discussed with respect to NVDIMMs, the operations can be extended to all disk types including serial attached small computer system interface (SAS) drives, serial AT attachment (SATA) drives, non-volatile memory express (NVMe) drives, solid state drives (SSDs), hard disk drives (HDDs), or the like as long as the disk is configured with namespace partitions.

The central processing unit 102 may operate to provide data processing functionality of information handling system 100, such as is typically associated with an information handling system. As such, central processing unit 102 represents a data processing apparatus, such as one or more processor cores, and the associated data input and output (I/O) functionality, such as a chipset component, and other I/O processor components. The central processing unit 102 operates to execute machine-executable code to perform the data processing tasks associated with information handling system 100.

The memory controller 126 represents a portion of a processor complex that is dedicated to the management of the data storage and retrieval from the memory devices of information handling system 100, and information handling system 100 may include one or more additional memory controllers similar to the memory controller 126, as needed or desired. The memory controller 126 may reside on a system printed circuit board, may be integrated into an I/O processor component, may be integrated with a processor on a system-on-a-chip (SoC), or may be implemented in another way, as needed or desired. The memory controller 126 operates to provide data and control interfaces to one or more DIMM, such as flash DIMMs 104, 106, and 108, in accordance with a particular memory architecture. For example, the memory controller 126 and the flash DIMMs 104, 106, and 108 may operate in accordance with a Double-Data Rate (DDR) standard, such as a JEDEC DDR4 or DDR5 standard.

During operation, before any usable storage space within the flash DIMMs 104, 106, and 108 can be accessed by the OS 124, goal configurations for the flash DIMMs 104, 106, and 108 are created. The goal configuration can include a mode of operation, an interleave set or sets from the flash DIMMs 104, 106, and 108, or the like. The mode of operation can be an application-direct mode, a memory mode, a storage mode, or the like. In the application-direct mode, applications executed by the processor core 120 via the OS 124 can directly access data stored within the flash DIMMs 104, 106, and 108. In the memory mode, a dynamic random access portion (DRAM) of the flash DIMMs 104, 106, and 108 can be accessed to store data in the flash DIMMs 104, 106, and 108. In the storage mode, data can be accessed in the flash DIMMs 104, 106, and 108 in a block data format. These modes of operation can be set as attributes for the flash DIMMs 104, 106, and 108 by the OS 124, by unified extensible firmware interface (UEFI) environment of the BIOS 122, or the like. After the goal configuration for the flash DIMMs 104, 106, and 108 has been set, the information handling system 100 can create a pool of memory storage from the existing interleave set of flash DIMMs 104, 106, and 108. In previous information handling systems having flash DIMMs, the information handling system would need to be rebooted after the creation of a pool. Then after the information handling system 100 comes up out of reboot the BIOS 122 or OS 124 can create namespaces within the flash DIMMs 104, 106, and 108.

If a goal configuration is changed in a previous information handling system, a reboot of the information handling system 100 may be required to have the new goal configuration become effective. In an embodiment, the goal configuration change can either be a software configuration change or a hardware configuration change. For example, a software centric configuration change can relate to a change in the firmware of the flash DIMMs 104, 106, and 108, can be a reconfigure of a different pool on top of the goal configuration with a different attribute, can be a resize of a namespace, can be some changes in an interleave set, or the like. A hardware configuration change can be anything that is related to hardware setup. For example, a hardware configuration change may include the addition or removal of a flash DIMM from the information handling system 100, may be some changes in interleave set, or any other changes that is related to direct flash DIMM hardware properties.

An exemplary hardware configuration change can include the flash DIMM 108 being added to the information handling system 100. In this exemplary configuration, the flash DIMMs 104 and 106 can be previously assigned with processor core 120 and configured as an interleave set so that the flash DIMMs 104 and 106 operate as a single storage device for the CPU 102. As stated above, this disclosure is not limited to an interleave set of flash DIMMs 104 and 106, but can be applied to an N-way interleave set, as indicated by the ellipses in between flash DIMMs 104 and 106. However, for brevity and clarity the discussion herein will be described with respect to an interleave set with flash DIMMs 104 and 106. If a new memory device, such as flash DIMM 108, is added to the information handling system 100, then the flash DIMM 108 can be configured for use by the CPU 102 during the next basic input/output system (BIOS) initialization. In other embodiment, more than one flash DIMM can be added to the information handling system 100 without varying from the scope of this disclosure.

However, as stated above, goal configuration changes are not allowed in previous information handling systems once one or more flash DIMMs are configured as an interleave set with goal configurations without a reboot of the information handling system 100. Thus, during the BIOS 122 initialization, after the information handling system 100 is reboot, the flash DIMM 108 may either be configured with the new flash DIMM 108 as part of it's own interleave set, or all of the flash DIMMs 104, 106, and 108 re-configured to a single interleave set. The BIOS 122 or OS 124 can then create usable namespaces on the flash DIMMs 104, 106, and 108. In another situation, the flash DIMMs 104, 106, and 108 can already be configured as a single interleave set and one of the flash DIMMs, such as flash DIMM 104, can be removed. In this situation, the information handling system 100 is reset to reconfigure the configuration goals for the flash DIMMs 106 and 108. The removal or addition of flash DIMMs to the information handling system 100 can be hardware configuration changes for the goal configurations of the flash DIMMs 104, 106, and 108 that would result in a reboot of the information handling system 100. Thus, goal configuration changes can result in down time of the information handling system 100 while the information handling system 100 is rebooted to implement the changes in the goal configuration. Therefore, an improved goal configuration change without reboot or reset of the information handling system 100 to reduce down time of the information handling system 100 is described herein.

Figure 2:
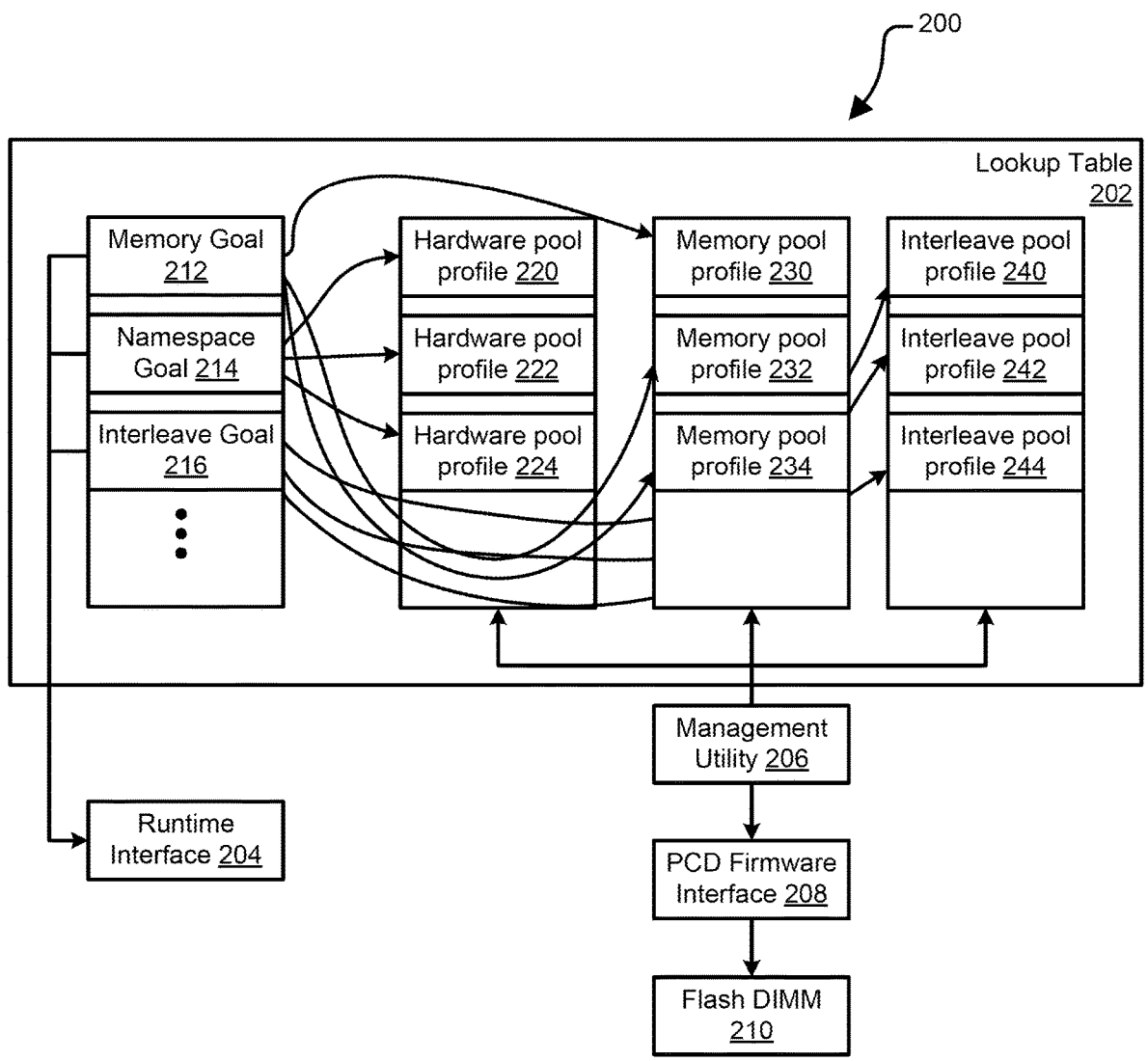
FIG. 2 is a diagram of multiple configuration profiles within a look-up table of the information handling system according to at least one embodiment of the disclosure.

An administrator of the information handling system 100, can create multiple profiles in the lookup table 132 and these profiles can be associated with different goal configurations, such as a memory goal configuration 212, a namespace goal configuration 214, an interleave goal configuration 216, or the like as shown in FIG. 2.

FIG. 2 illustrates a portion of the information handling system 200 including a lookup table 202, a runtime interface 204, a management utility 206, a process control daemon (PCD) firmware interface 208, and a flash DIMM 210. In an embodiment, the lookup table 202 can be substantially similar to the lookup table 132 of FIG. 1. In an embodiment, the runtime interface 204 can be substantially similar to the flash DIMM runtime interface 140 of FIG. 1. In an embodiment, the management utility 206 can be substantially similar to the management utility 110 of FIG. 1. In an embodiment, the flash DIMM 210 can be substantially similar to any of the flash DIMMs 104, 106, and 108 of FIG. 1. The lookup table 202 includes the memory goal configuration 212, the namespace goal configuration 214, and the interleave goal configuration 216. The operation of the information handling system 100 will be described with respect to FIGS. 1 and 2.

Referring now to FIG. 2, the administrator can create and store multiple goal configurations, such as memory goal configuration 212, namespace goal configuration 214, and interleave goal configuration 216. The administrator can then create and store multiple profiles for each goal configuration. For example, hardware pool profiles 220, 222, and 224 (220-224) can be stored within the lookup table 202 and associated with the namespace goal configuration 214. The hardware pool profiles 220-224 can include different namespace assignments with the flash DIMMs, such as flash DIMMs 104, 106, and 108 of FIG. 1, connected to the information handling system 100. Memory pool profiles 230, 232, and 234 (230-234) can be stored within the lookup table 202 and associated with the memory goal configuration 212. In an embodiment, the memory pool profiles 230-234 can include different allocations of an amount of memory within each of the flash DIMMs 104, 106, and 108 that is available for storage of data by the processor core 120. Interleave pool profiles 240, 242, and 244 (240-244) can be stored within the lookup table 202 and associated with the interleave goal configuration 216. In an embodiment, the interleave pool profiles 240-244 can include different interleave configurations based on different number of flash DIMMs connected to the information handling system 100. One of ordinary skill in the art would recognize that while only three goal configurations with each goal configuration having three profiles have been described herein, additional goal configurations and additional profiles can be implemented within the lookup table 202 without varying from the scope of this disclosure.

During operation of the information handling system 100, a goal configuration change can be detected by the management utility 206. In an embodiment, the goal configuration change can be detected via the management utility 206 receiving a goal configuration change request. The goal configuration change request can include a request to change metadata for the flash DIMMs 104, 106, and 108, change operational modes of the flash DIMMs 104, 106, and 108, change memory capacities of the flash DIMMs 104, 106, and 108, or the like. Upon the goal configuration change request being received the management utility 206 can categorized the request as either a hardware centric change or a software centric change. In an embodiment, the management utility 206 can perform this categorization based on the hardware pool profiles 220-224, the memory pool profiles 230-234, and the interleave pool profiles 240-244.

If the management utility 206 detects that the goal configuration change is software centric, the software centric profiles within the lookup table 202 can include instructions for runtime interface 204 to re-configure the flash DIMMs 104, 106, and 108 of FIG. 1. For example, if an administrator requests a goal configuration change to resize one or more namespaces within the flash DIMMs 104, 106, and 108, one of the hardware pool profiles 220-224, such as profile 220, can be selected for the namespace goal configuration 214. The runtime interface 204 can then execute the instructions found in hardware pool profile 220 to update the namespace allocations within the flash DIMMs 104, 106, and 108. The runtime interface 204 can then utilize firmware mailbox interface 208 to update the metadata and NFIT tables 130 for the flash DIMMs 104, 106, and 108 without resetting the information handling system 100. In an embodiment, the firmware mailbox interface 208 can provide communication between the flash DIMMs 104, 106, and 108 and the CPU 102, via the BIOS 122, via out-of-band communication, via the OS 124, or the like. The previous creation and storage of the profiles 220-224, 230-234, and 240-244 can enable the software centric goal configuration changes to be implemented without resetting the information handling system 100.

If the management utility 206 detects that the goal configuration change is hardware centric, the hardware centric profiles within the lookup table 202 can include instructions for runtime interface 204 to re-configure the flash DIMMs 104, 106, and 108 of FIG. 1. For example, if the goal configuration change is based on an administrator removing or adding a flash DIMM to the information handling system, the management utility can identify a selected interleave pool profile 240, 242, or 244 associated with the interleave goal configuration 216 to implement the hardware configuration change request. The runtime interface 204 can then execute the instructions found in an interleave pol profile, such as profile 242, to update the interleave sets of the flash DIMMs 104, 106, and 108. For example, if flash DIMM 106 is removed from the information handling system 100, the interleave pool profile 242 can include instructions to create an interleave set from flash DIMMs 104 and 108. The runtime interface 204 can then utilize firmware mailbox interface 208 to update the metadata and NFIT tables 130 for the flash DIMMs 104, 106, and 108 without resetting the information handling system 100. The previous creation and storage of the profiles 220-224, 230-234, and 240-244 can enable the hardware centric goal configuration changes to be implemented without resetting the information handling system 100.

Figure 3:
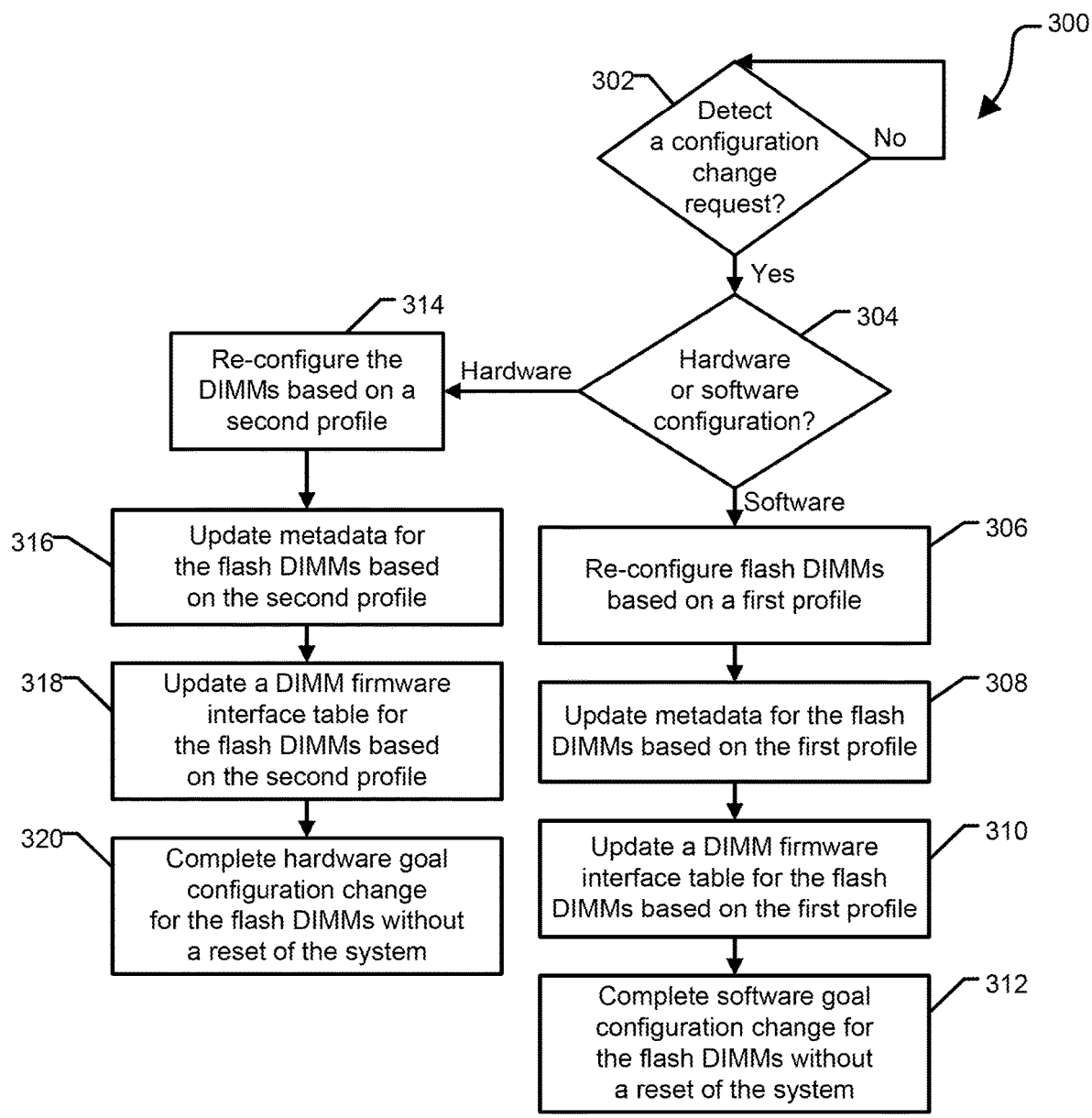
FIG. 3 is a flow diagram of a method for changing goal configurations for flash dual in-line memory modules of the information handling system without a reset of the information handling system according to at least one embodiment of the present disclosure.

FIG. 3 is a flow diagram of a method 300 for changing goal configurations for flash dual in-line memory modules of the information handling system without a reset of the information handling system according to at least one embodiment of the present disclosure. At block 302, a determination is made whether a configuration change request is detected. If a configuration change request is detected, a determination is made whether the configuration change is a hardware configuration or a software configuration at block 304. If the change is a software centric configuration change, the flash DIMMs within the information handling system are re-configured based on a first profile at block 306. In an embodiment, different profiles for goal configuration changes can be stored in a lookup table of a BIOS in the CPU of the information handling system. In an embodiment, the first profile can include instructions to change the configuration of the flash DIMMs, such as instructions to change the firmware of the flash DIMMs, can be a reconfigure of a different pool on top of the goal configuration with a different attribute, can be a resize of a namespace, can be some changes in an interleave set, or the like.

At block 308, metadata for the flash DIMMs are updated based on the first profile. A NFIT for the flash DIMMs is updated based on the first profile at block 310. In an embodiment, the NFIT is stored in the BIOS in the CPU of the information handling system. At block 312, the software goal configuration change for the flash DIMMs is completed without a reset of the information handling system.

If, at block 304, the change is a hardware centric configuration change, the flash DIMMs within the information handling system are re-configured based on a second profile at block 314. In an embodiment, based the addition or removal of a flash DIMM from the information handling system 100, the second profile can include instructions to implement changes in interleave set, other changes that is related to direct flash DIMM hardware properties, or the like. At block 316, metadata for the flash DIMMs are updated based on the second profile. A NFIT for the flash DIMMs is updated based on the first profile at block 318. At block 320, the hardware goal configuration change for the flash DIMMs is completed without a reset of the information handling system.

Figure 4:
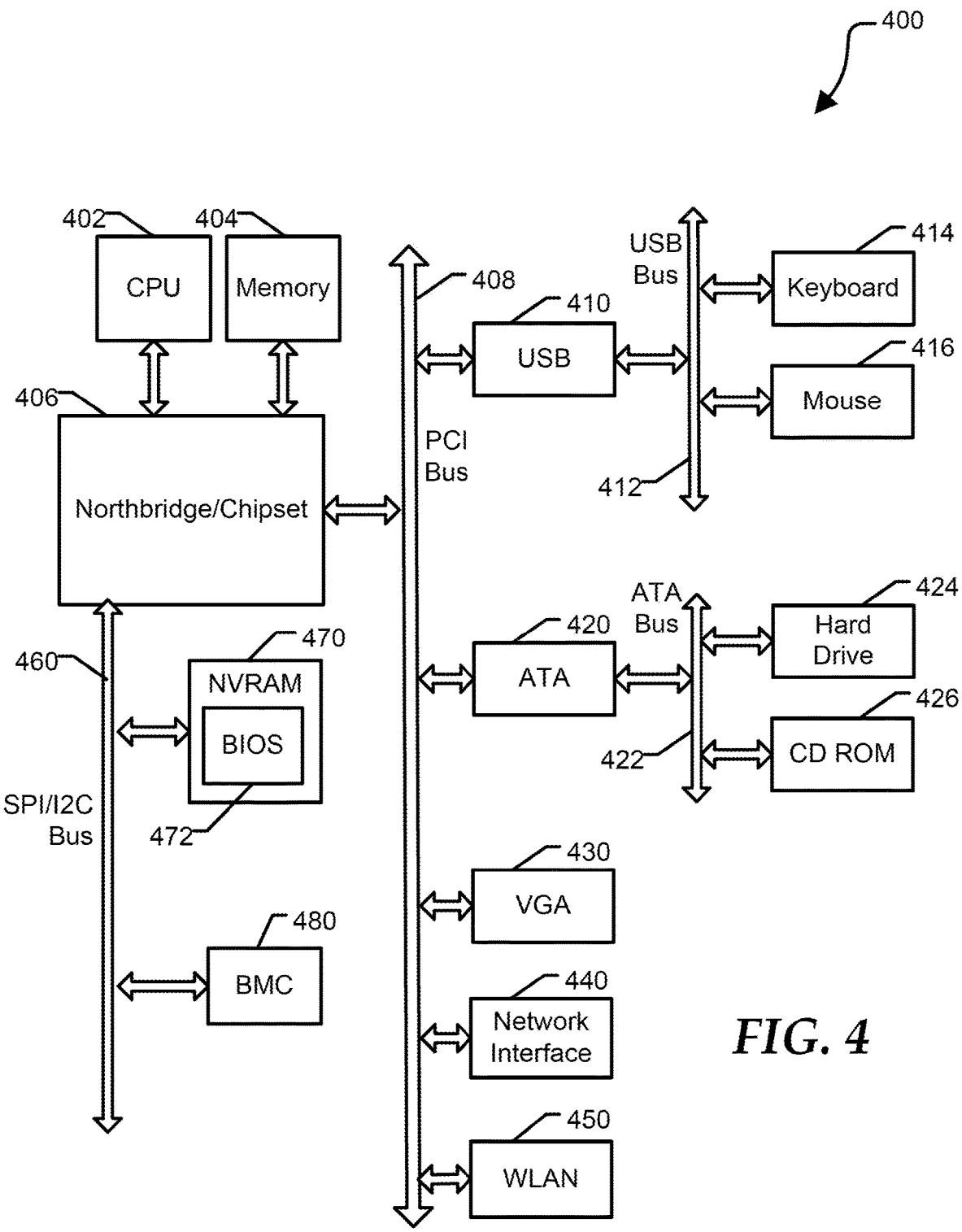
FIG. 4 is a block diagram of a general information handling system according to an embodiment of the present disclosure.

FIG. 4 illustrates a general information handling system 400 including a processor 402, a memory 404, a northbridge/chipset 406, a PCI bus 408, a universal serial bus (USB) controller 410, a USB 412, a keyboard device controller 414, a mouse device controller 416, a configuration an ATA bus controller 420, an ATA bus 422, a hard drive device controller 424, a compact disk read only memory (CD ROM) device controller 426, a video graphics array (VGA) device controller 430, a network interface controller (NIC) 440, a wireless local area network (WLAN) controller 450, a serial peripheral interface (SPI) bus 460, a NVRAM 470 for storing BIOS 472, and a baseboard management controller (BMC) 480. BMC 480 can be referred to as a service processor or embedded controller (EC). Capabilities and functions provided by BMC 480 can vary considerably based on the type of information handling system. For example, the term baseboard management system is often used to describe an embedded processor included at a server, while an embedded controller is more likely to be found in a consumer-level device. As disclosed herein, BMC 480 represents a processing device different from CPU 402, which provides various management functions for information handling system 400. For example, an embedded controller may be responsible for power management, cooling management, and the like. An embedded controller included at a data storage system can be referred to as a storage enclosure processor.

For purpose of this disclosure information handling system 400 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 400 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 400 can include processing resources for executing machine-executable code, such as CPU 402, a programmable logic array (PLA), an embedded device such as a System-on-a-Chip (SoC), or other control logic hardware. Information handling system 400 can also include one or more computer-readable medium for storing machine-executable code, such as software or data.

System 400 can include additional processors that are configured to provide localized or specific control functions, such as a battery management controller. Bus 460 can include one or more busses, including a SPI bus, an I2C bus, a system management bus (SMBUS), a power management bus (PMBUS), and the like. BMC 480 can be configured to provide out-of-band access to devices at information handling system 400. As used herein, out-of-band access herein refers to operations performed prior to execution of BIOS 472 by processor 402 to initialize operation of system 400.

BIOS 472 can be referred to as a firmware image, and the term BIOS is herein used interchangeably with the term firmware image, or simply firmware. BIOS 472 includes instructions executable by CPU 402 to initialize and test the hardware components of system 400, and to load a boot loader or an operating system (OS) from a mass storage device. BIOS 472 additionally provides an abstraction layer for the hardware, such as a consistent way for application programs and operating systems to interact with the keyboard, display, and other input/output devices. When power is first applied to information handling system 400, the system begins a sequence of initialization procedures. During the initialization sequence, also referred to as a boot sequence, components of system 400 are configured and enabled for operation, and device drivers can be installed. Device drivers provide an interface through which other components of the system 400 can communicate with a corresponding device.

Information handling system 400 can include additional components and additional busses, not shown for clarity. For example, system 400 can include multiple processor cores, audio devices, and the like. While a particular arrangement of bus technologies and interconnections is illustrated for the purpose of example, one of skill will appreciate that the techniques disclosed herein are applicable to other system architectures. System 400 can include multiple CPUs and redundant bus controllers. One or more components can be integrated together. For example, portions of northbridge/chipset 406 can be integrated within CPU 402. Additional components of information handling system 400 can include one or more storage devices that can store machine-executable code, one or more communications ports for communicating with external devices, and various input and output (I/O) devices, such as a keyboard, a mouse, and a video display. An example of information handling system 400 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

Information handling system 400 can include a set of instructions that can be executed to cause the information handling system to perform any one or more of the methods or computer based functions disclosed herein. The information handling system 400 may operate as a standalone device or may be connected to other computer systems or peripheral devices, such as by a network.

In a networked deployment, the information handling system 400 may operate in the capacity of a server or as a client user computer in a server-client user network environment, or as a peer computer system in a peer-to-peer (or distributed) network environment. The information handling system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single information handling system 400 is illustrated, the term "system" shall also be taken to include any collection of systems or sub-systems that individually or jointly execute a set, or multiple sets, of instructions to perform one or more computer functions.

The information handling system 400 can include a disk drive unit and may include a computer-readable medium, not shown in FIG. 4, in which one or more sets of instructions, such as software, can be embedded. Further, the instructions may embody one or more of the methods or logic as described herein. In a particular embodiment, the instructions may reside completely, or at least partially, within system memory 404 or another memory included at system 400, and/or within the processor 402 during execution by the information handling system 400. The system memory 404 and the processor 402 also may include computer-readable media.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a processor or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
   a plurality of flash dual in-line memory modules;
   a central processing unit to communicate with the flash dual in-line memory modules; and
   a management interface to detect a configuration change request for the flash dual in-line memory modules, to determine whether the configuration change request is a hardware configuration change or a software configuration change, and in response to the configuration change request being the software configuration change the management interface to: re-configure the flash dual in-line memory modules based on a first profile identified by the configuration change request without resetting the information handling system, update metadata for the flash dual in-line memory modules based on the first profile without resetting the information handling system; and update a dual in-line memory module firmware interface table for the flash dual in-line memory modules based on the first profile without resetting the information handling system.

2. The information handling system of claim 1, wherein the flash dual in-line memory modules are re-configured by a flash dual in-line memory module runtime service being invoked based on the first profile.

3. The information handling system of claim 1, wherein the management interface is further to update the flash dual in-line memory modules via a firmware mailbox interface.

4. The information handling system of claim 1, wherein the first profile of the configuration change request is selected from a lookup table within a memory of the information handling system.

5. The information handling system of claim 1, in response to the configuration change request being the hardware configuration change the management interface to: re-configure the flash dual in-line memory modules based on a platform capability of a second profile identified by the configuration change request.

6. The information handling system of claim 5, wherein the flash dual in-line memory modules are re-configured without resetting the information handling system in response to a change in the second profile being supported by the platform capability.

7. The information handling system of claim 5, wherein the flash dual in-line memory modules are re-configured by a flash dual in-line memory module runtime service being invoked based on a platform capability of the second profile.

8. A method comprising:
   detecting, by a management interface, a configuration change request for a plurality of flash dual in-line memory modules of an information handling system;
   determining whether the configuration change request is a hardware configuration change or a software configuration change; and
   in response to the configuration change request being the software configuration change:
      re-configuring the flash dual in-line memory modules based on a first profile identified by the configuration change request without resetting the information handling system;
      updating metadata for the flash dual in-line memory modules based on the first profile without resetting the information handling system; and
      updating a dual in-line memory module firmware interface table for the flash dual in-line memory modules based on the first profile without resetting the information handling system.

9. The method of claim 8, wherein re-configuring the flash dual in-line memory modules includes invoking a flash dual in-line memory module runtime service based on the first profile.

10. The method of claim 8, further comprising:
   updating the flash dual in-line memory modules via a firmware mailbox interface.

11. The method of claim 8, wherein the first profile of the configuration change request is selected from a lookup table within a memory of the information handling system.

12. The method of claim 8, wherein in response to the configuration change request being the hardware configuration change:
   re-configuring the flash dual in-line memory modules based on a platform capability of a second profile identified by the configuration change request.

13. The method of claim 12, wherein the flash dual in-line memory modules are re-configured without resetting the information handling system in response to a change in the second profile being supported by the platform capability.

14. The method of claim 12, wherein the flash dual in-line memory modules are re-configured by a flash dual in-line memory module runtime service being invoked based on a platform capability of the second profile.

15. A method comprising:
   configuring a plurality of flash dual in-line memory modules of an information handling system according to a first configuration goal;
   detecting, by a management interface, a configuration change request for the flash dual in-line memory modules;
   determining whether the configuration change request is a hardware configuration change or a software configuration change;
   in response to the configuration change request being the software configuration change:
      re-configuring the flash dual in-line memory modules based on a first profile identified by the configuration change request without resetting the information handling system;
      updating metadata for the flash dual in-line memory modules based on the first profile without resetting the information handling system; and
      updating a dual in-line memory module firmware interface table for the flash dual in-line memory modules based on the first profile without resetting the information handling system; and
   in response to the configuration change request being the hardware configuration change:
      re-configuring the flash dual in-line memory modules based on a platform capability of a second profile identified by the configuration change request.

16. The method of claim 15, wherein re-configuring the flash dual in-line memory modules based on the first profile comprises:
   invoking a flash dual in-line memory module runtime service based on the first profile.

17. The method of claim 15, wherein in response to the configuration change request being the software change, the method further comprises:
   updating the flash dual in-line memory modules via a firmware mailbox interface.

18. The method of claim 15, wherein the first profile of the configuration change request is selected from a lookup table within a memory of the information handling system.

19. The method of claim 15, wherein the flash dual in-line memory modules are re-configured without resetting the information handling system in response to a change in the second profile being supported by the platform capability.

20. The method of claim 15, wherein the flash dual in-line memory modules are re-configured by a flash dual in-line memory module runtime service being invoked based on a platform capability of the second profile.

* * * * *